Figure 3:
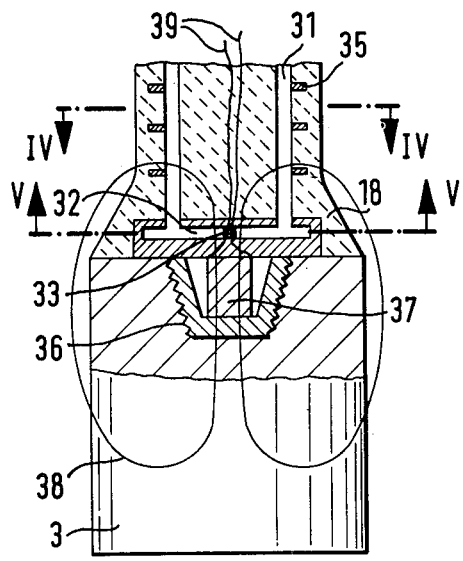

United States Patent [19]
Schwabe et al.

[11] 4,256,918
[45] Mar. 17, 1981

[54] ELECTRODE FOR ARC FURNACES

[75] Inventors: William E. Schwabe, Parma Heights, Ohio; Emil Elsner; Rudolph Kasper, both of Baden-Baden, Fed. Rep. of Germany

[73] Assignee: Korf-Stahl AG, Baden-Baden, Fed. Rep. of Germany

[21] Appl. No.: 913,051

[22] Filed: Jun. 6, 1978

[30] Foreign Application Priority Data

Jun. 6, 1977 [DE] Fed. Rep. of Germany ....... 2725537

[51] Int. Cl.³ ............................................. H05B 7/06
[52] U.S. Cl. .......................................... 13/11; 13/15; 13/18 C
[58] Field of Search ............ 13/11, 18 R, 18 A, 18 B, 13/18 C, 15

[56] References Cited
U.S. PATENT DOCUMENTS

| | | | |
|---|---|---|---|
| 3,368,019 | 2/1968 | De Corso et al. | 13/18 A |
| 3,385,987 | 5/1968 | Wolf et al. | 13/18 A |
| 3,392,227 | 7/1968 | Ostberg | 13/18 A |
| 3,634,590 | 1/1972 | Inouye et al. | 13/18 A |
| 4,121,042 | 10/1978 | Prenn | 13/18 R |

*Primary Examiner*—Roy N. Envall, Jr.

[57] ABSTRACT

An electrode for electric arc furnaces, in particular for production of iron and steel, comprising a liquid-cooled upper portion, which may be inserted into an electrode holder, a lower portion forming the electrode tip being detachably fastened to the upper portion, which upper portion contains a conduit system for the cooling liquid protected by a fire-proof material, by way of which conduit system the electric current of the arc electrode may also be conducted. Heat conducting projections covered by the fire-proof material are provided on the outer surface of the conduit system facing the furnace chamber, while an electromagnet for producing a magnetic field is disposed in the region of the fastening point of the electrode tip to cause the arc on the electrode tip to move.

18 Claims, 10 Drawing Figures

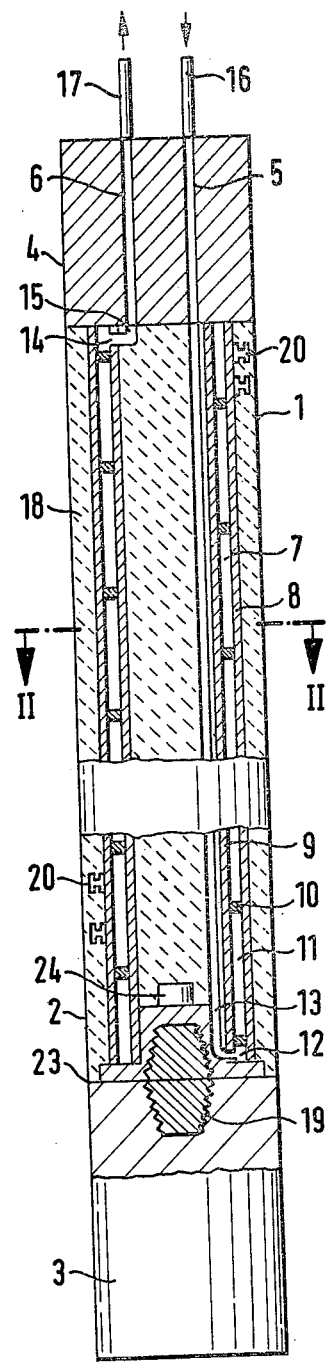
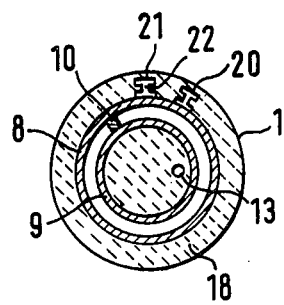
Fig.1
Fig.2

ELECTRODE FOR ARC FURNACES

The invention relates to an electrode for arc furnaces, particularly for the production of iron and steel, comprising a liquid-cooled upper portion, which may be inserted into an electrode holder, a lower portion, which forms the electrode tip, being detachably fastened thereto, wherein the upper portion contains a conduit system protected by a fire-proof material for the cooling liquid, by way of which system the electric current of the arc electrode may also be conducted.

Electrodes of this kind, as are known by way of example from DT-OS No. 1 565 751, have an advantage over the customary carbon electrodes in that only the electrode tip is consumable and must be replaced, the greater portion of the electrode, however, being able to be used for a considerable period of time as a non-consumable liquid-cooled electrode holder. The disadvantage of known electrodes of this kind is however their susceptibility when used in an electric arc melting furnace, in which scrap iron is for example melted. During the insertion of the electrode it may happen that the fire-proof protective coating around the conduit system of the liquid-cooled upper portion is damaged and arc-backs occur between the conduit system for the cooling liquid conducting the electric current of the arc electrode and the metal charge of the electric arc furnace. In this case the conduit system for the cooling liquid is also damaged very quickly, water may break into the electric arc furnace and explosions may occur.

Liquid-cooled arc electrodes designed as completely non-consumable electrodes are also exposed to this risk, indeed to an increased extent. Electrodes of this kind are known for example from DT-OS No. 1 565 208 or from U.S. Pat. No. 3,689,740. In respect of these electrodes the electrode tip also comprises liquid-cooled metal and the arc is prevented from burning in in that the arc is continuously moved over the electrode tip with sufficient speed by way of a magnetic field. Since the metal surface here is directly exposed to the stresses during operation inside an electric arc melting furnace, damage to the unprotected electrode surface may easily occur through short circuits during the insertion of the electrode or during the melting of the charge and thus the dangerous effect described above may be produced. This also seems to be the reason why the use of such electrodes in electric arc furnaces for melting scrap iron has not yet become prevalent.

The object of the invention is to provide an electrode with a long lifetime which is able to resist the great mechanical stresses and the great stresses exerted by the atmosphere in the furnace during operation inside an electric arc melting furnace, particularly also inside a furnace in which scrap iron is melted.

The invention provides a solution to the problems mentioned above in respect of an electrode of the kind mentioned in the introduction in that there are provided on the outer surface of the conduit system heat conducting projections covered by the fire-proof material and there is disposed in the region of the fastening point of the electrode tip a means for producing a magnetic field, by means of which magnetic field the arc on the electrode tip may be transposed into movement.

Advantageous embodiments of the invention are described further below.

The heat conducting projections on the outer surface of the conduit system not only achieve a better hold for the fire-proof material and a more even cooling off of this material, which increases the resistance to mechanical stress, but the projections, when disposed at a sufficiently small distance from one another, also act as a closed guard grille against the penetration of a foreign body into the electrode surface. The cross section of the projections is preferably so designed that if the fire-proof layer covering the projections is damaged, so that a fault current penetrates, then the projections melt easily and thus interrupt the faulty current path.

The creation of a magnetic field in the region of the fastening point of the electrode tip produces a movement of the arc on the electrode tip in the same way as with the known, non-consumable arc electrodes. According to the length of the consumable electrode tip this effect occurs either at the time of the first charge of the electrode tip or alternatively after the electrode tip has burnt to such an extent that the arc reaches the region of the magnetic field. It was not previously considered expedient in respect of consumable electrodes to cause the arc on the electrode surface to move. Such a measure only seemed necessary in respect of unprotected metal electrodes, since in this case the arc burns quickly if it acts continuously on the same area. This problem does not exist in respect of a consumable electrode and the effort of producing a magnetic field does not therefore appear justifiable. However, it has been discovered that this effort is more than compensated by the increase in the lifetime of the consumable electrode tip so that such effort is also advantageous when consumable electrode tips of graphite or similar materials are used.

It appears particularly advantageous to locate the means for producing a magnetic field in a fastening nipple for the electrode tip. If the nipple is designed as an independent member it is possible to replace this member quickly and thus to replace a damaged means for producing a magnetic field or to provide a means for producing a magnetic field more suitable for the electrode tip or the melting process in question.

Figure 6:
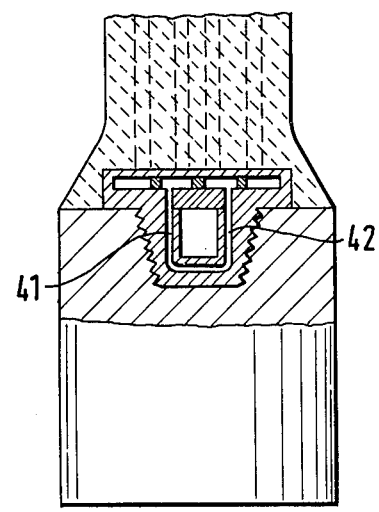
Figure 4:
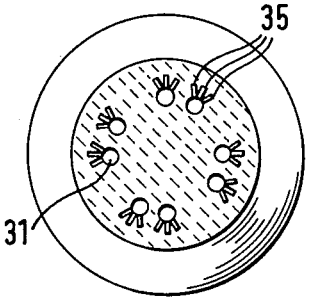
Figure 5:
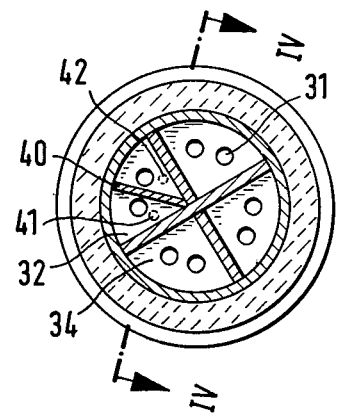
Figure 7:
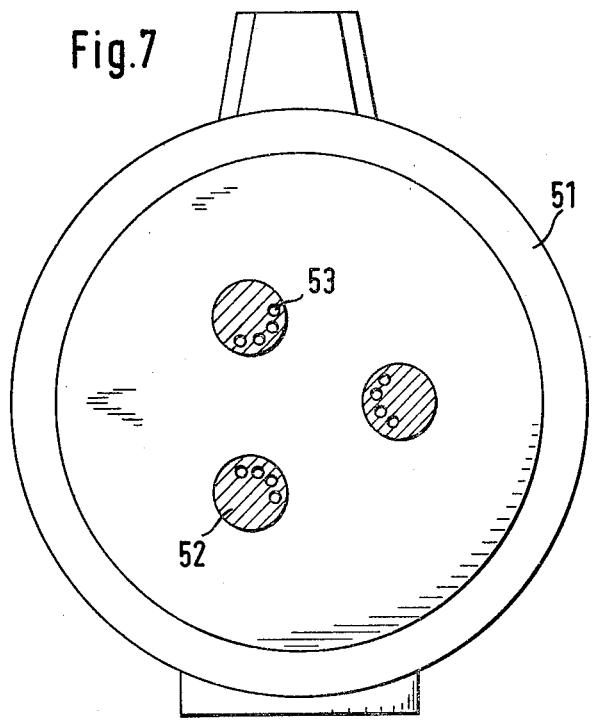
Figure 8:
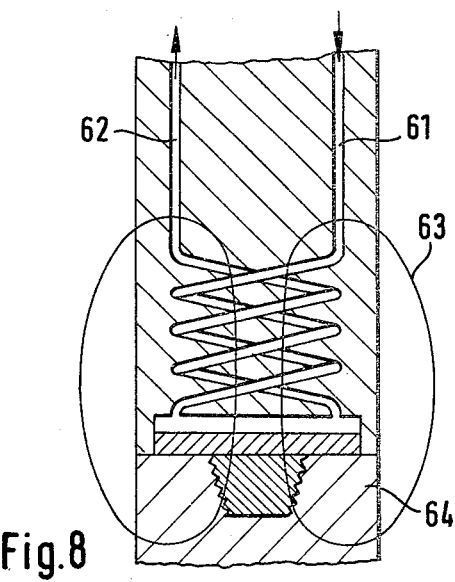
Figure 9:
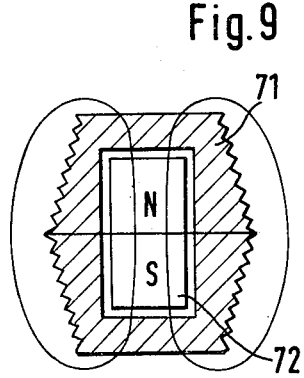
Figure 10:
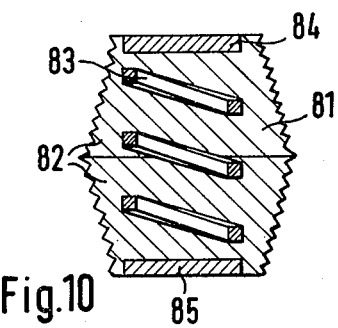

The invention is described more closely by way of examples with the aid of 10 figures, wherein:

FIG. 1 is an electrode according to the invention partly in longitudinal section, FIG. 2 is a cross section taken on the line A—A of the electrode according to FIG. 1, FIG. 3 is a section of the lower portion of a further embodiment of an electrode according to the invention, FIG. 4 is a cross section taken on the line A—A of the electrode according to FIG. 3, FIG. 5 is a cross section taken on the line B—B of the electrode according to FIG. 3, FIG. 6 is a section taken on the line C—C of the electrode according to FIG. 3, FIG. 7 is a plan view of a furnace vessel with three electrodes, FIG. 8 is a section of a further embodiment of an electrode to illustrate one possibility of producing a magnetic field, FIG. 9 is a fastening nipple for the electrode tip with permanent magnets, and FIG. 10 is a fastening nipple for the electrode tip with a coil to produce a magnetic field.

The electrode 1 for arc furnaces illustrates in FIGS. 1 and 2 comprises a liquid-cooled upper portion 2 and a lower portion 3 being detachably fastened to the upper portion and forming the electrode tip. The upper portion 2 has a cylindrical region 4 which may be inserted into an electrode holder (not shown) and which comprises passages 5 and 6 for a cooling liquid. In addition, a conduit system 7 for the cooling liquid, e.g. water, is located in the upper portion 2 of the electrode in a hollow cylindrical space in the interior of the electrode, the electric current of the arc electrode also being conducted by way of this conduit system. In respect of the embodiment illustrated in FIGS. 1 and 2 this conduit system 7 comprises an outer hollow metal cylinder 8, an inner hollow metal cylinder 9 and a dividing wall 10 helically disposed between the outer and the inner hollow cylinders, wherein a helical flow passage 11 for the cooling liquid is formed between two hollow cylinders. In the lowermost region of this flow passage a feed line 13 for the cooling liquid has its mouth in the region 12, this feed line being connected to passage 5. In the uppermost region of the passage 11 a drain line 15, being connected to region 6, has its mouth in the region 14. The cooling liquid is fed to passage 5 by way of a connecting member 16 and is drained off again by way of a connecting member 17 connected to passage 6. The conduit system 7 in the upper portion of the electrode 1 is protected by way of a fire-proof material 18 covering the conduit system on every side. The lower portion, i.e., the electrode tip 3, is of consumable construction and is manufactured for example from graphite, carbon or similar material. The said lower portion is detachably fastened at the lower end of the upper portion by way of a nipple 19. Heat conducting projections 20, which are covered by the fire-proof material 18, are provided on the outer surface of the conduit system 7, i.e., in the present instance on the outer surface of the outer hollow metal cylinder 8. Although only a few of these projections are illustrated both in the axial and in the circumferential directions of the electrode, these projections are preferably disposed at regular intervals over the entire outer surface of the outer hollow metal cylinder 8. They should comprise material being a good thermal conductor and should have sufficient strength on the one hand to perfect as even a cooling of the fire-proof material as possible and on the other hand to give this fire-proof material an improved hold. It would be advantageous if in addition these projections were bad conductors of electricity. Therefore, plastics materials and other isolating materials may be used for these projections. In the present embodiment however metal, i.e., electrically conductive projections 20 are used, which are welded onto the outer surface of the conduit system. In order to prevent an inadmissibly high introduction of current into the conduit system in the event of local damage to the fire-proof material, thus creating the risk of a short circuit, these projections are designed as safety fuses by appropriately designing their cross-section. Between their fastening point on the conduit system 7 and their free end 21 facing the outer surface of the electrode they have at least one region of reduced cross-section 22, in which region they melt quickly and interrupt the current path if an excessive current passes through. A multiplicity of different forms for such projections fulfilling this condition is known.

A permanent magnet 24 is provided in the region of the fastening point 23 of the electrode tip 3. This serves as a means for producing a magnetic field, by means of which the arc on the electrode tip may be caused to move. The lines of force of this permanent magnet 24 must therefore reach at least into the upper region of the electrode 3, in order to ensure that in the event of the consumable electrode being used up as far as this region the arc is forced into movement on the electrode tip by the magnetic field. In the described embodiment a radially symmetrical field is produced by magnet 24, which is co-axial with the electrode. It may however be advantageous to produce magnetic fields which are neither radially symmetrical nor co-axial with the electrode, in order to avoid arc blow to one side which causes one-sided consumption of the electrode tip and leads to increased consumption of the fire-proofing material. The one-sided consumption of the electrode tip can be converted by inclining the axis of the magnetic pole, i.e., the line going through the north pole and the south pole, downwards towards the axis of the furnace.

The electrode according to the invention is also resistant to the high stress which occurs during the melting of scrap iron and other charge materials into steel. The tip of the electrode has the rigidity of a graphite electrode and also has a substantially improved capacity to withstand stresses along the length of its water-cooled region in relation to comparable electrodes. Should, however, local damage occur to the fire-proof material 18 in the event of great local stress through rigid scrap elements, then direct mechanical contact with the conduit system is prevented by the projections 20 and inadmissibly high currents are not able to flow over these projections due to their safety fuse characteristics. As soon as the consumable electrode tip has been used up to such an extent that the arc reaches the radius of action of the magnet 24 the further consumption of the electrode tip 3 is effectively delayed by the forced movement of the arc on the surface of the electrode tip.

In relation to the embodiment according to FIG. 1 several modifications have been undertaken in respect of the embodiment of an arc electrode according to the invention illustrated in FIGS. 3, 4, 5 and 6. Thus the conduit system for the cooling fluid located in the hollow cylindrical space of the electrode is designed in the form of distinct cooling tubes 31 disposed circumferentially on the electrode, the axes of said tubes being substantially parallel to the axis of the electrode. Instead of the distinct cooling tubes an outer and an inner hollow cylinder with axially-running radial dividing walls between the hollow cylinders could be provided as in the embodiment according to FIGS. 1 and 2, so that axial cooling passages are formed along the circumference. They are interconnected both above and below by way of a box-shaped connecting member 32, of which only the lower one is illustrated. The box member is subdivided into spaces 34 by way of dividing walls 33 by way of which spaces the reflective lower ends of two cooling tubes 31 are connected, so then the liquid is fed by way of the one cooling tube in a downward direction and is passed back in an upward direction by way of the other cooling tube. The projections 35, which have the same task as the projections 20 of the electrode according to FIG. 1, are mounted on the surfaces of the cooling tube 31 facing the outer surface of the electrode. In this embodiment the projections comprise cylindrical metal pins.

The lower box member 32 is of very sturdy construction particularly on its side facing the electrode tip and is manufactured from a material of high thermal conductivity, preferably copper. It carries a nipple 36, also of copper, on its underside. The nipple contains in its interior an electromagnet 37 excited by current, said magnet producing the radially symmetrical magnetic field outlined by lines of force 38. The current supply is effected by leads 39. The consumable electrode tip 3 is detachably fastened to the liquid-cooled upper portion of the electrode by way of the nipple 36. Since in the embodiment according to FIG. 3 the magnet is located in the fastening nipple and can thus be positioned deeper than in the embodiment according to FIG. 1, the arc reaches the radius of action of magnet 37 earlier during consumption of the consumable electrode tip 3, whereby the lifetime is further increased. Furthermore, in the present embodiment the cross-section of the electrode tip is enlarged in relation to the cross-section of the upper liquid-cooled portion of the electrode. This has the purpose on the one hand of creating sufficient room for the magnet 37 and on the other hand of extending the lifetime of the electrode tip. The transition region from the smaller cross-section of the upper portion to the larger cross-section of the consumable electrode tip 3 is formed continuously by way of fireproof material 18. In the embodiment according to FIG. 3, the nipple 36 must be manufactured from non-magnetic material in order to prevent a magnetic short circuit. Appropriate materials for this are graphite, or in the proposed embodiment, copper. In the embodiment according to FIG. 1 a nipple of magnetic material is advantageous since this is simultaneously used to guide the magnetic flux.

In the embodiment according to FIG. 3 furthermore, a cooling effect produced by the cooled box 32 and the cooled nipple 36 also acts upon the upper region of the electrode tip, this cooling effect likewise having a positive effect on the lifetime of the consumable electrode tip. An embodiment of the nipple cooling is illustrated in FIGS. 5 and 6. One of the chambers 32 contains an additional dividing wall 40, which prevents the water flowing in from flowing out again by way of the adjacent tube. The cooling water must first enter the nipple space lying beneath by way of a bore 41 and return to the adjacent chamber from the bore 42.

FIG. 7 illustrates a plan view of the lower vessel 51 of an electric arc melting furnace with inserted electrodes 52. The electrodes are disposed in the normal way inside the lower vessel of the melting furnace. Suitable electrodes are those wherein, as with the electrodes according to FIGS. 3 and 4, the conduit system for the cooling liquid contains a number of cooling tubes disposed circumferentially on the electrode. In contrast to the foregoing embodiment however, the cooling tubes 53 are only provided along the length of a portion of the circumference of the electrode. The electrodes are inserted into their holders in such way that the portion cooled by the cooling tubes points respectively radially inwards. The embodiment is intended to illustrate that the conduit system located in the upper portion of the electrode need not be disposed radially symmetrically but is expediently adapted to the respective requirements—e.g., to the current supply or to the cooling.

The embodiment according to FIG. 8 illustrates a further modification to produce a magnetic field. Here the magnetic field is not produced by way of a permanent magnet but by way of the electrode current itself, when the current flows through the helically disposed cooling tubes 61 and 62. The current flows through both cooling tubes in the same direction while the cooling means is passed by way of tube 61 downwards and by way of tube 62 upwards again. Under these conditions, the magnetic field outlined by the lines of force, which causes the arc to move on the electrode tip 64, is produced.

As already described in connection with FIG. 1, the magnetic field can also be obliquely inclined to the electrode axis in this case.

FIG. 9 illustrates a nipple 71 of copper, graphite, or similar non-magnetic material, which contains in its interior a magnet 72. A nipple of this kind makes it possible to produce a magnetic field in the region of the fastening area of an electrode tip detachably fastened by way of the nipple, which causes the arc to move in the radius of action of the magnetic field, by easy means and which can be replaced at any time and adapted to the required conditions.

FIG. 10 illustrates another nipple, which contains a means for producing a magnetic field. This nipple 81 contains inside a mouldable material 82 of temperature-proof, non-magnetic, electrically ill-conductive material an expanded spiral 82 of electrically conductive material which is connected electrically at its front sides to electrically conductive plates 84 and 85. The arc current supplied by way of the upper plate 84 is forced to flow through the spiral 83 on its way to the electrode tip and thereby produces a magnetic field. It flows out at the lower plate 85 again and into the material of the electrode tip. In the use of a nipple of this kind, which is distinguished by its great rigidity, care must of course be taken that the electrode current flowing to the electrode tip does not find a substantial parallel path by which it can flow without creating a magnetic field. The current path inside of the nipple can, of course, by disposing a spiral or a loop in another appropriate manner, be so designed that magnetic fields are produced in a different manner.

We claim:

1. Electrode for electric arc furnaces, in particular for production of iron and steel, comprising: a liquid-cooled upper portion adapted to be inserted into an electrode holder, a lower portion forming an electrode tip and being detachably fastened to said upper portion, said detachable electrode tip being a consumable member, said upper portion including a conduit system for cooling liquid protected by a fire-proof material, said conduit system being adapted to conduct electric current to the electrode tip, a nipple fastening said electrode tip to said upper portion, and means for producing a magnetic field and for causing the arc on the electrode tip to move, said means being disposed in the lower part of the upper portion of the electrode.

2. Electrode for electric arc furnaces, in particular for production of iron and steel, comprising: a liquid-cooled upper portion adapted to be inserted into an electrode holder, a lower portion forming an electrode tip and being detachably fastened to said upper portion, said detachable electrode tip being a consumable member, said upper portion including a conduit system for cooling liquid protected by a fire-proof material, said conduit system being adapted to conduct electric current to the electrode tip, a nipple fastening said electrode tip to said upper portion, and means for producing a magnetic field and for causing the arc on the electrode tip to move, said means being disposed in said nipple.

3. An electrode according to claim 1 or 2, comprising heat conducting projections on the outer surface of said conduit system to face a furnace chamber of said furnace, and fireproof material covering said projections.

4. Electrode according to claim 3, wherein the conduit system for the cooling fluid includes an outer hollow metal cylinder, on the outer surface of which the projections are mounted, an inner hollow metal cylinder and a helically disposed dividing wall between the outer and the inner hollow cylinder.

5. Electrode according to claim 4, wherein the dividing walls are disposed along the electrode axis.

6. Electrode according to claim 1 or 2, wherein the conduit system for the cooling fluid contains a number of cooling tubes disposed circumferentially on the electrode, the axes of said cooling tubes being substantially parallel to the electrode axis and the projections being mounted on the surface of said cooling tubes facing the outer side of the electrode.

7. Electrode according to claim 6, wherein the cooling tubes are only provided along the length of one portion of the circumference of the electrode.

8. Electrode according to claim 3, wherein the projections have at least one region between their fastening point on the conduit system and their end region facing the outer surface of the electrode, said at least one region having a reduced cross-section.

9. Electrode according to claim 8, wherein a permanent magnet is provided in the region of the fastening point of the electrode tip.

10. Electrode according to claim 8, wherein an electromagnet is provided in the region of the fastening point of the electrode tip.

11. Electrode according to claim 8, wherein the lower region of the cooled current tubes is helically-shaped.

12. Electrode according to any one of claims 9 to 11, wherein the axis of the magnetic pole of the magnetic field is directed obliquely downwards towards the furnace axis.

13. Electrode according to claim 2, wherein the nipple is made of a non-magnetic material and that the nipple contains said means for producing the magnetic field.

14. Electrode according to claim 13, wherein the nipple is exchangeable.

15. Electrode according to claim 13, wherein the nipple is substantially made of copper.

16. Electrode according to claim 13, wherein the nipple is substantially made of graphite.

17. Electrode according to claim 1 or 2, wherein the electrode tip has a larger cross-section than the liquid-cooled upper portion of the electrode at least in the vicinity of its fastening point.

18. Electrode according to claim 17, wherein the transition between the differing cross-sections is continuous.

* * * * *